United States Patent [19]

Allen

[11] Patent Number: 4,536,542

[45] Date of Patent: Aug. 20, 1985

[54] METHOD FOR ALTERING THE SURFACE OF THERMOPLASTIC POLYMERS

[75] Inventor: Richard B. Allen, Dalton, Mass.

[73] Assignee: General Electric Company, Pittsfield, Mass.

[21] Appl. No.: 553,173

[22] Filed: Nov. 18, 1983

[51] Int. Cl.³ .............................................. C08L 69/00
[52] U.S. Cl. ...................................... 525/67; 524/508;
524/537; 524/611; 525/92; 525/146; 525/147;
525/439; 525/468
[58] Field of Search .................. 525/146, 67, 92, 147,
525/439, 468; 524/508, 537, 611; 528/392

[56] References Cited

U.S. PATENT DOCUMENTS

| | | | |
|---|---|---|---|
| 3,780,140 | 12/1973 | Hammer | 260/884 |
| 3,801,673 | 2/1974 | O'Connell | 260/873 |
| 4,000,216 | 12/1976 | Lang | 260/857 UN |
| 4,070,532 | 1/1978 | Hammer | 526/11.2 |
| 4,145,373 | 5/1979 | Baron et al. | 260/873 |
| 4,172,859 | 10/1979 | Epstein | 428/402 |
| 4,218,547 | 8/1980 | Ellis et al. | 525/148 |

FOREIGN PATENT DOCUMENTS 1049185 2/1979 Canada .
1508562 4/1978 United Kingdom .

*Primary Examiner*—Theodore E. Pertilla
*Attorney, Agent, or Firm*—Hedman, Gibson, Costigan & Hoare

[57] ABSTRACT

Normally glossy thermoplastic compositions of aromatic polycarbonates, alone, or with second resins are surface-altered by adding a small effective amount of a solid terpolymer of ethylene, carbon monoxide and a third monomer, e.g., vinyl acetate.

8 Claims, No Drawings

METHOD FOR ALTERING THE SURFACE OF THERMOPLASTIC POLYMERS

The present invention relates to changing the surface characteristics of thermoplastic polymers. More particularly it concerns combining an additive with a thermoplastic polymer whereby one or more surface characteristics, e.g., gloss, abrasion, resistance, paintability, and the like, are changed in a desirable and predictable manner.

BACKGROUND OF THE INVENTION

Many thermoplastic polymers when thermoformed by casting or molding, and especially injection molding, calendering and extrusion, and the like, have smooth, glossy surfaces. While such surfaces are highly desirable in many applications, there are certain cases wherein they are distinctly disadvantageous. For example, glossy surfaces resist painting because the paints, inks and varnishes tend not to adhere; smooth surfaces mar and abrade, developing a hazy appearance; smooth thermoplastic surfaces tend to stick together when stacked—the so-called blocking phenomenon—, and smooth surfaces reflect light. Light reflection, especially, is a problem because this can cause operators of business machines molded with glossy surfaces to become tired after prolonged usage, because stray light is reflected into their eyes.

Thermoplastics for which surface altering is especially needed are those which injection mold into high strength pieces having highly glossy surfaces. These include the engineering thermoplastics, such as aromatic polycarbonates, aromatic polyester carbonates, aromatic polysulfone carbonates, mixtures thereof and the like, alone, or combined with polyesters of aliphatic or cycloaliphatic diols, or mixtures of such diols, and aromatic dicarboxylic acids, and/or vinyl aromatic polymers, co-polymers or terpolymers, such as polystyrene, rubber modified polystyrene, styrene maleic anhydride copolymers; styrene-acrylonitrile-butadiene terpolymers, mixtures of the foregoing and the like. Business machine housings, especially cathode ray tube housings, and picture tube protective shields, molded from such polymers have a high specular gloss at 60 degrees, according to ASTM Standard Test Method D 523, and a significant reduction in such gloss is desirable, while still maintaining all of the other valuable properties of such materials, especially srrength and flame retardancy, in certain embodiments.

Previous approaches to altering the surface of thermoplastics have involved the use of additives or mechanical treatments such as calendering or sandblasting. The mechanical treatments cannot generally be used in injection molding and extrusion processes. With respect to the additive approach, this generally comprises using inorganic particulate materials, such as calcium silicates, magnesium silicates, amorphous silica gels and the like. Although these work rather well in plasticized poly(vinyl chloride) resins, they are difficult to compound into the high melting engineering thermoplastics which are used in high quality business machine housings, and the like. The difficulty is in obtaining uniformly dispersed particles on the surface of the articles so that predictable gloss reduction is obtained, while at the same time not reducing physical strength. Other additives have been proposed, selected from organic polymeric materials. Canadian Pat. No. 1,049,185, for example, describes cross-linked acrylate polymers, and states that they are useful in a wide range of thermoplastics, including polycarbonates and mixtures thereof, but then goes on to state that the cross-linked polymer should be particulate in form, having an average particle size of 1 to 30 microns. This causes the same difficulty in dispersion and nonuniform gloss-reduction as is commonly experienced when particulate inorganic additives are employed and the resulting composition is injection molded and/or extruded. A further approach suggested for use in poly(vinyl chloride) compounds used in house siding and other rigid profile extrusions, is to blend into the vinyl halide resin a small amount of an impact modifier, such as ethylene-vinyl acetate copolymer and then to add a dulling agent. In a Technical Bulletin on terpolymer resin modifiers, ELVALOY 837 and 838, the DuPont Company has suggested that if a terpolymer of ethylene, vinyl acetate and carbon monoxide is used in poly(vinyl chloride) a desirable matte finish can be obtained without dulling agents. Compositions comprising such terpolymers and a wide variety of other resins, especially poly(vinyl chloride) resins, but including polycarbonates and polyesters, are taught in Hammer, U.S. Pat. No. 3,780,140, but there is no suggestion therein that molded articles having reduced gloss can be obtained without a dulling agent.

It has now been discovered that aromatic polycarbonate resins and modified such resins, alone, or in combination with other resins, can be altered in surface appearance by adding a terpolymer of ethylene, a carbon monoxide and a third monomer. This is unexpected because experiments have shown that without carbon monoxide in the additive, no surface altering is achieved, i.e., gloss is not reduced. The latter such compositions are described in Baron, et al., U.S. Pat. No. 4,145,373 and U.K. Pat. No. 1,508,567. Moreover, the present compositions are almost always compounded above 500° F. and the additives are taught not to be stable at such temperatures.

SUMMARY OF THE INVENTION

According to the present invention, there is provided a method for altering the surface of an extrudable, moldable or heat formable thermoplastic polymer composition selected from
(a) an aromatic polycarbonate, an aromatic polyester carbonate, an aromatic dihydric phenol sulfone carbonate, or a mixture of any of the foregoing, alone, or in combination with
(b)
  (i) a polyester resin comprising units of an aliphatic diol, a cycloaliphatic diol, or a mixture of such diols, and an aromatic diacid,
  (ii) a vinyl aromatic polymer, copolymer or terpolymer, or
  (iii) a mixture of (i) and (ii), said method comprising blending with said polymer composition before or during processing
(c) a copolymer comprising, by weight
  (i) 40–80% ethylene,
  (ii) 3–30% carbon monoxide, and
  (iii) 5–60% of one or more termonomers copolymerizable therewith to produce solid terpolymer, in an amount of from about 0.2 to about 15 parts by weight per 100 parts by weight of the total blend.

The term "altering the surface" when used herein and in the appended claims contemplates predictably and uniformly changing the surface of a thermoplastic article. Without limitation, the term "altering" embraces producing ultimately flatted articles, articles of improved scuff resistance, articles of improved printability, articles having anti-blocking properties, and the like, all without sacrificing any desirable physical property. Especially preferred is the production of flatted articles, i.e., articles having significantly reduced surface gloss, e.g., as measured by a glossmeter at 60°. In any event, the process preferably should produce products having a 60-degree gloss of 90 or below (ASTM D-523), and especially preferably 70 or below.

In other preferred features, component (a) comprises an aromatic polycarbonate, preferably poly(bisphenol A carbonate). In another preferred feature component (a) is an aromatic polycarbonate and component (b) comprises a polyester of an aliphatic diol and an aromatic diacid. Especially preferably, component (a) comprises poly(bisphenol-A carbonate) and component (b) comprises poly(ethylene terephthalate).

The process of this invention is particularly applicable to altering the surface of thermoplastic compositions which also include an effective amount of a flame retardant agent. These ordinarly are difficult to modify, without adversely affecting flame retardant properties.

In preferred embodiments, termonomer (c)(iii) comprises an unsaturated mono- or dicarboxylic acid of 2-20 carbon atoms, esters of said unsaturated mono- or dicarboxylic acids, vinyl esters of saturated carboxylic acids where the acid has 1-18 carbon atoms, vinyl alkyl ethers wherein the alkyl group has 1-18 carbon atoms, acrylonitrile, norbornene, alpha-olefins of 3-12 carbon atoms, and vinyl aromatic compounds. Especially preferred as comonomer (c)(iii) is vinyl acetate.

DETAILED DESCRIPTION OF THE INVENTION

With respect to component (a), this can comprise an aromatic polycarbonate resin, which can be made by those skilled in this art or can be obtained from a variety of commercial sources. They may be prepared by reacting a dihydric phenol with a carbonate precursor, such as phosgene, a haloformate or a carbonate ester. Typically, they will have recurring structural units of the formula:

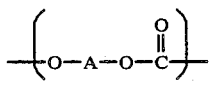

wherein A is a divalent aromatic radical of the dihydric phenol employed in the polymer producing reaction. Preferably, the aromatic carbonate polymers have an intrinsic viscosity ranging from 0.30 to 1.0 dl./g. (measured in methylene chloride at 25° C.) By dihydric phenols is meant mononuclear or polynuclear aromatic compounds containing two hydroxy radicals, each of which is attached to a carbon atom of an aromatic nucleus. Typical dihydric phenols include 2,2-bis-(4-hydroxy-phenyl)propane; 2,2-bis-(3,5-dimethyl-4-hydroxyphenyl)propane, 4,4'-di-hydroxydiphenyl ether, bis(2-hydroxyphenyl)methane, mixtures thereof and the like. The preferred aromatic carbonate polymer for component (a) is a homopolymer derived from 2,2-bis(4-hydroxy-phenyl)propane(bisphenol-A).

Poly(ester-carbonates) for use in the invention are known and can be obtained commercially. Generally, they are copolyesters comprising recurring carbonate groups:

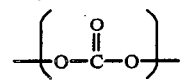

carboxylate groups

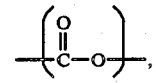

and aromatic carbocyclic groups in the linear polymer chain, in which at least some of the carboxylate groups and at least some of the carbonate groups are bonded directly to ring carbon atoms of the aromatic carbocyclic groups. These poly(ester-carbonate) copolymers, in general, are prepared by reacting a difunctional carboxylic acid, such as phthalic acid, isophthalic acid, terephthalic acid, homophthalic acid, o-, m-, and p-phenylenediacetic acid, the polynuclear aromatic acids, such as diphenic acid, 1,4-naphthalic acid, mixtures of any of the foregoing, and the like, with a dihydric phenol and a carbonate precursor, of the types described above. A particularly useful polyester carbonate is derived from bisphenol-A, isophthalic acid, terephthalic acid, or a mixture of isophthalic acid and terephthalic acid, or the reactive derivatives of these acids such as terephthaloyl di-chloride, isophthaloyl dichloride, or a mixture thereof, and phosgene. The molar proportions of dihydroxy diaryl units to benzenedicarboxylate units to carbonate units can range from 1:0.30–0.80:0.70–0.20 and the molar range of terephthalate units to isophthalate ate units can range from 9:1 to 2:8 in this preferred family of resins.

The aromatic dihydric phenol sulfone resins used in component (a) are a family of resins which can be made by those skilled in this art. For example homopolymers of dihydric phenol, and a dihydroxydiphenyl sulfone and a carbonate precursor can be prepared as well as copolymers of a dihydric phenol and a carbonate precursor can be made according to the description in Schnell, et al., U.S. Pat. No. 3,271,367. A preferred material is made by polmerizing bis-(3,5-dimethyl-4-hydroxy phenyl)sulfone, alone, or especially in combination with bisphenol a with phosgene or a phosgene precursor, in accordance with the description in Fox, U.S. Pat. No. 3,737,409. Especially preferred is a copolymer made by reacting 40–99 wt percent of the sulfone, 1 to 60 wt percent of the bisphenol with phosgene.

With respect to component (b)(i), polyesters suitable for use herein are derived from an aliphatic or cycloaliphatic diol, or mixtures thereof, containing from 2 to about 10 carbon atoms and at least one aromatic dicarboxylic acid. Preferred polyesters are derived from an aliphatic diol and an aromatic dicarboxylic acid have repeated units of the following general formula:

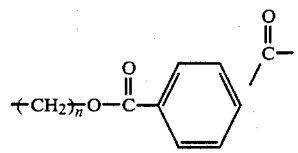

wherein n is an integer of from 2 to 4. The most preferred polyester is poly(ethylene terephthalate).

Also contemplated herein are the above polyesters with minor amounts, e.g., from 0.5 to about 2 percent by weight, of units derived from aliphatic acid and/or aliphatic polyols, to form copolyesters. The aliphatic polyols include glycols, such as poly(ethylene glycol). All such polyesters can be made following the teachings of, for example, U.S. Pat. Nos. 2,465,319 and 3,047,539.

The polyesters which are derived from a cycloaliphatic diol and an aromatic dicarboxylic acid are prepared, for example, by condensing either the cis- or trans-isomer (or mixtures thereof) of, for example, 1,4-cyclohexanedimethanol with an aromatic dicarboxylic acid so as to produce a polyester having recurring units of the following formula:

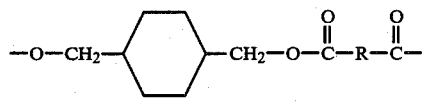

wherein the cyclohexane ring is selected from the cis- and trans-isomers thereof and R represents an aryl radical containing 6 to 20 carbon atoms and which is the decarboxylated residue derived from an aromatic dicarboxylic acid.

Examples of aromatic dicarboxylic acids represented by the decarboxylated reside R are isophthalic or terephthalic acid, 1,2-di(p-carboxyphenyl)ethane, 4,4'-dicarboxydiphenyl ether, etc., and mixtures of these. All of these acids contain at least one aromatic nucleus. Acids containing fused rings can also be present, such as in 1,4- or 1,5-naphthalenedicarboxylic acids. The preferred dicarboxylic acids are terephthalic acid or a mixture of terephthalic and isophthalic acids.

Another preferred polyester may be derived from the reaction of either the cis- or trans-isomer (or a mixture thereof) of 1,4-cyclohexanedimethanol with a mixture of isophthalic and terephthalic acids. Such a polyester would have repeating units of the formula:

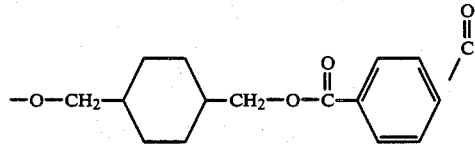

Still another preferred polyester is a copolyester derived from a cyclohexane dimethanol, an alkylene glycol and an aromatic dicarboxylic acid. These copolyesters are prepared by condensing either the cis- or trans-isomer (or mixtures thereof) of, for example, 1,4-cyclohexane-dimethanol and an alkylene glycol with an aromatic dicarboxylic acid so as to produce a copolyester having units of the following formula:

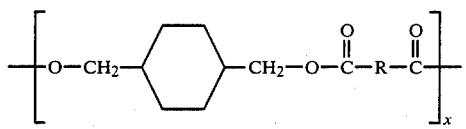

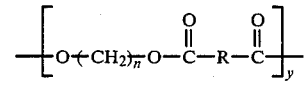

wherein the cyclohexane ring is selected from the cis- and trans-isomers thereof, R is as previously defined, n is an integer of 2 to 4, the x units comprise from about 10 to about 90 percent by weight and the y units comprise from about 90 to about 10 percent by weight.

Such a preferred copolyester may be derived from the reaction of either the cis- or trans-isomer (or mixtures thereof) of 1,4-cyclohexanedimethanol and ethylene glycol with terephthalic acid in a molar ratio of 1:2:3. These copolyesters have repeating units of the following formula:

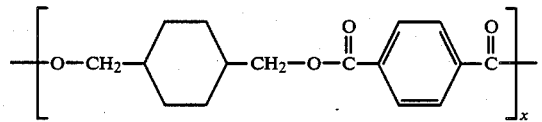

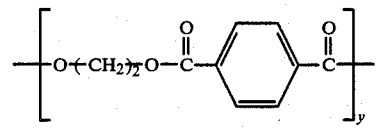

wherein x and y are as previously defined.

The polyesters described herein are either commercially available or can be produced by methods well known in the art, such as those set forth in, for example, U.S. Pat. No. 2,901,466.

The polyesters used herein have an intrinsic viscosity of from about 0.4 to about 2.0 dl/g. as measured in a 60:40 phenol/tetrachloroethane mixture or similar solvent at 23°–30° C.

Vinyl aromatic polymer resins useful as component (b)(ii) are in general those having at least 25% of their units derived from a monomer having the formula

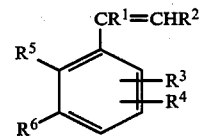

wherein $R^1$ and $R^2$ are selected from the group consisting of lower alkyl or alkenyl groups of from 1 to 6 carbon atoms and hydrogen; $R^3$ and $R^4$ are selected from the group consisting of chloro, bromo, hydrogen and lower alkyl of from 1 to 6 carbon atoms; $R^5$ and $R^6$ are selected from the group consisting of hydrogen and lower alkyl and alkenyl groups of from 1 to 6 carbons or $R^5$ and $R^6$ may be concatenated together with hydrocarbyl groups to form a naphthyl group.

Materials that may be copolymerized with the units of the vinyl aromatic monomer include those having the general formula:

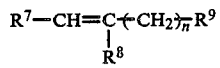

wherein $R^7$ and $R^8$ represent a substituent selected from the group consisting of hydrogen, halogen, an alkyl group of 1–4 carbon atoms, carboalkoxy or $R^7$ and $R^8$ taken together represent an anhydride linkage (—COOOC—) and $R^9$ is hydrogen, vinyl, an alkyl or alkenyl group having 1 to 12 carbon atoms, cycloalkyl, carboalkoxy, alkoxy-alkyl, alkyl carboxyl, ketoxy, halogen, carboxy, cyano or pyridyl and n is 0 or a whole number between 1 and 9.

The general formula set forth includes by way of example, homopolymers such as polystyrene and polymonochlorostyrene, the modified polystyrenes, such as rubber-modified, high-impact polystyrene and the styrene containing copolymers such as the styrene acrylonitrile copolymers, styrene butadiene copolymers, styreneacrylonitrile-α-alkyl styrene copolymers, styreneacrylonitrile-butadiene copolymers, poly-α-methylstyrene, copolymers of ethylvinyl benzene, and divinylbenzene styrene-maleic anhydride copolymers and styrene-butadiene block copolymers.

The rubber modified high impact polystyrenes may be made with diene rubbers such as butadiene rubber, styrene-butadiene rubber, acrylonitrile rubber or ethylene-propylene copolymers or EPDM rubber.

The ABS copolymers are well known and many suitable types are commercially available. Either an acrylonitrile-butadiene-styrene or an acrylonitrile-butadiene-alpha-methyl styrene may be sued as the ABS component. A useful method for preparing these copolymers comprises grafting 73 parts styrene and 42 parts acrylonitrile onto polybutadiene latex containing 58 parts polybutadiene in the presence of 3 parts soap, 1.7 parts marcaptan and 0.4 parts potassium peroxydisulfate at 50° C. The latex is coagulated and the product is then milled for 10 minutes at 320° F. Other useful methods for preparing these copolymers may be found in U.S. Pat. Nos. 2,550,349; 2,550,139; 2,698,313; U.K. Pat. No. 698,385; U.S. Pat. Nos. 2,713,566; 2,820,773; and 2,908,661, all of which are hereby incorporated by reference.

For those embodiments of the invention having flame retardant properties, conventional additives can be used in conventional amounts. For example, sulfonate salts in small amounts can be used, such as a sulfonate salt, e.g., potassium benzenesulfonic acid at at least 0.1, and preferably 0.4 parts per hundred by weight of polycarbonate, or aromatic halogen compounds, such as tetrabromobisphenol A homopolymers or copolymers or oligomers, alone, or with a suitable synergist, such as antimony oxide, can be used in effective amounts to provide flame resistance, e.g., about 2–12 parts by weight of bromine per 100 parts by weight of flammable resin content.

The polymers of ethylene, carbon monoxide and a third monomer used herein as component (c) are prepared by the polymerization of a mixture of, by weight, (i) 40–80% ethylene, (ii) 3–30% carbon monoxide, and (iii) 5–60% of one or more termonomers copolymerizable therewith to produce solid copolymers, as is shown in the above-mentioned U.S. Pat. No. 3,780,140. Preferably, the copolymers will consist of 50–70% ethylene, 3–15% carbon monoxide, and 10–34% of said termonomer(s). More preferred copolymers are those in which vinyl acetate is the termonomer. The copolymers normally have a melt index in the range of 0.1–3000, preferably 1–500. As is described in the foregoing patent, the comonomers are reacted in a suitable vessel at a temperature of at least about 140° C., preferably at 155°–225° C. at a pressure in the range of 5,000 to 60,000 psi, preferably 20,000–35,000 psi. The rates of monomer addition are adjusted, in accordance with known techniques, to give a uniform composition. Usually a free-radical catalyst is employed, such as an azo compound, a peroxide, a perester or a percarbonate. The polymer is recovered by standard methods, such as by discharge molten from the reactor, cooling, and cutting into pellets.

The relative amounts of components used in the method of the present invention can vary widely. For example, the aromatic carbonate polymer component (a) can comprise from 100 to 1 parts by weight and polyester and/or vinyl aromatic resin component (b)(i) and (b)(ii) can comprise correspondingly from 0 to 99 parts by weight. Furthermore, the ratio of polyester (b)(i) and vinyl aromatic resin (b)(ii) can vary within the range 0 to 100 and 100 to 0. Effective amounts of the additive (c) for surface altering will vary within the range of 0.2 to about 15 parts by weight depending somewhat on the nature of the effect, e.g., flatting, anti-blocking, improved printability, scuff resistance, and/or the hiding of surface imperfections. One will use the lowest amount to obtain the desired result, since there is the least tendency to adversely affect physical properties in so-doing. In any event, for flatting, 2 to 5 parts by weight of component (c) for each 100 parts by weight of total composition is a good general level for use.

Any suitable method may be employed to prepare the polymer compositions. For example, any method normally employed for incorporating additives, such as plasticizers and fillers into thermoplastic polymers, including but not limited to extruders, dough mixers, Banbury mixers, and other mixing equipment. The resultant mixtures may be handled in any conventional manner employed for the fabrication or manipulation of thermoplastic resins. The materials may be formed or molded using compression, injection, and extrusion techniques and the like.

One preferred method of blending the polycarbonates (a) and optional second resin (b) with the surface altering additive (c) is to blend the ingredients in either pellet or powdered form in a tumble blender. The tumble blend is passed through an extruder and cut into pellets. The pellets can then be molded into the desired shape to form the preferred article.

The compositions may further contain any effective amount of any suitable additives—in addition to the optional flame retardant additives mentioned above—such as stabilizers, anti-oxidants, dyes, pigments, fillers, $TiO_2$.

DESCRIPTION OF THE PREFERRED EMBODIMENTS

The invention is further illustrated but is not intended to be limited by the following examples. Test specimens (2½″ sq. × ⅛″ dimension) were measured for specular gloss at 60° by ASTM test method D-523-78 on a Gardner glossmeter, model Glossguard II. The working standard was (highly polished, plane, black glass). Some of the test specimens (2½ × ½″ × ⅛″) were measured for notched Izod impact strength by ASTM test method D-256. Some of the specimens (2½ square×⅛″) were measured for Gardner impact strength. Flame retardant ratings were determined by Underwriters Laboratories Bulletin 94 Procedures, VO being the highest rating.

EXAMPLES 1-3

A polycarbonate resin made from bisphenol A and phosgene was tumble blended with a phosphite heat stabilizer and with three different terpolymers of ethylene, carbon monoxide and vinyl acetate. For comparison purposes, a formulation was also made substituting a copolymer of ethylene and vinyl acetate for the respective terpolymers. The blends were extruded in a 1 inch single-screw extruder at about 525° C. and cut into pellets. The pellets were injection molded into test specimens in a 3 oz. machine at 550° F. (barrel). The formulations used and the results obtained are set forth in Table 1:

TABLE 1
Compositions Comprising Polycarbonate Resins and Ethylene/Co/Vinyl Acetate Terpolymers

| Example | 1A* | 1 | 2 | 3 |
|---|---|---|---|---|
| Composition (parts by weight) | | | | |
| Polycarbonate of bisphenol-A and phosgene[a] | 100 | 100 | 100 | 100 |
| Copolymer of ethylene and vinyl acetate[b] | 4 | — | — | — |
| Terpolymer of ethylene, carbon monoxide and vinyl acetate[c] | — | 4 | — | — |
| Terpolymer of ethylene, carbon monoxide and vinyl acetate[d] | — | — | 4 | — |
| Terpolymer of ethylene, carbon monoxide and vinyl acetate[e] | — | — | — | 4 |
| Properties | | | | |
| Spectral gloss, 60° | 105 | 83 | 55 | 75 |

*Control
[a]General Electric Company, LEXAN
[b]DuPont Company, ELVAX 150, 33% Vinyl acetate.
[c]DuPont Company, ELVALOY 837, Tm, 73° C.
[d]DuPont Company, ELVALOY 741, Tm, 66° C.
[e]DuPont Company, ELVALOY 742, Tm, 45° C.

It is seen that the terpolymers of ethylene, carbon monoxide and vinyl acetate when added to the polycarbonate resin substantially reduced gloss while the copolymer, without carbon monoxide, did not reduce gloss at all.

EXAMPLES 4 AND 5

The general procedure of Examples 1-3 was repeated with the addition of flame retardant and drip retardant additives, as well as a pigment. The formulations used and the results obtained, including impact strength and flame test ratings are set forth in Table 2:

TABLE 2
Flame Retardant Compositions Comprising Polycarbonate Resins and Ethylene/CO/Vinyl Acetate Terpolymers

| Example | 4A* | 4B* | 4 | 5 |
|---|---|---|---|---|
| Composition (parts by weight) | | | | |
| Polycarbonate of bisphenol-A and phosgene[a] | 100 | 100 | 100 | 100 |
| Copolymer of ethylene and vinyl acetate[b] | 3 | — | — | — |
| Copolymer of ethylene and vinyl acetate[c] | — | 3 | — | — |
| Terpolymer of ethylene, carbon monoxide and vinyl acetate[d] | — | — | 3 | — |
| Terpolymer of ethylene, carbon monoxide and vinyl acetate[e] | — | — | — | 4 |
| Phosphite heat stabilizer | 0.1 | 0.1 | 0.1 | 0.1 |
| Fluorocarbon drip suppressant | 0.3 | 0.3 | 0.3 | 0.3 |
| Sulfonate salt flame retardant | 0.4 | 0.4 | 0.4 | 0.4 |
| Titanium dioxide pigment package | 1.22 | 1.22 | 1.22 | 1.22 |
| Properties | | | | |
| Spectral gloss, 60° C. | 101 | 100 | 68 | 38 |
| Gardner impact strength, in. lbs. | 320 | 320 | 320 | 320 |
| Izod impact strength, ft. lbs./in. | 16 | 15.3 | 16.2 | 15.9 |
| UL94 Flame Test Rating, | VO | VO | VO | VO |

⅛″ spec.
*Control
[a]General Electric Company, LEXAN
[b]DuPont Company, ELVAX 150, 33% vinyl acetate.
[c]U.S.I. Chemicals, VYNATHENE EY 903-25,
[d]DuPont Company, ELVALOY 837, Tm, 73° C.
[e]DuPont Company, ELVALOY 838, Tm, 74° C.

The foregoing results demonstrate that the terpolymers are effective to reduce the gloss of flame retarded polycarbonate compositions without reducing the physical strength. The controls demonstrate that, without carbon monoxide, copolymers of ethylene and vinyl acetate are ineffective to reduce gloss.

EXAMPLES 6-8

The general procedure of Examples 1-3 was repeated using a blend of polycarbonate and polyester resin. For control purposes, one formulation omitting the terpolymer was also tested. The formulations used and the results obtained are set forth in Table 3.

TABLE 3
Compositions Comprising Polycarbonate and Polyester Resins and Ethylene/CO/Vinyl Acetate Terpolymers

| Example | 6A* | 6 | 7 | 8 |
|---|---|---|---|---|
| Composition (parts by weight) | | | | |
| Polycarbonate of bisphenol-A and phosgene[a] | 75 | 75 | 75 | 60 |
| Poly(ethylene terephthalate)[b] | 25 | 25 | 25 | 40 |
| Terpolymer of ethylene, carbon monoxide and vinyl acetate[c] | — | 4 | — | — |
| Terpolymer of ethylene, carbon monoxide and vinyl acetate[d] | — | — | 4 | — |
| Terpolymer of ethylene, carbon monoxide and vinyl acetate[e] | — | — | — | 4 |
| Phosphite stabilizer | — | — | — | 0.07 |
| Properties | | | | |
| Spectral gloss, 60° | 100 | 52 | 42 | 85 |
| Izod impact strength, ft.-lbs./in. | 1.2 | 3.7 | 3.5 | 1.7 |

*Control
[a]General Electric Company, LEXAN
[b]Eastman Kodak Company, TENITE 7352
[c]DuPont Company, ELVALOY 837
[d]DuPont Company, ELVALOY 838
[e]DuPont Company, ELVALOY 741

The foregoing data show that the terpolymers are effective to reduce the gloss of polycarbonate-polyester blends. It also shows that impact strength is improved too.

EXAMPLES 9–10

The general procedure of Examples 4 and 5 is repeated with a flame retarded polycarbonate/polyester blend which also includes an ultraviolet absorber. The formulations used and the results obtained are set forth in Table 4.

TABLE 4

Flame Retardant Compositions of Polycarbonates, Polyesters and a Terpolymer of Ethylene, Carbon Monoxide and Vinyl Acetate

| Example | 9 | 10 |
|---|---|---|
| Composition (parts by weight) | | |
| Polycarbonate of bisphenol-A and phosgene[a] | 62.8 | 62.8 |
| Poly(ethylene terephthalate)[b] | 20 | 20 |
| Terpolymer of ethylene, carbon monoxide and vinyl acetate[c] | 3 | 1.0 |
| Phosphite heat stabilizer | 0.07 | 0.07 |
| Sulfonate salt flame retardant | 0.4 | 0.4 |
| Tetrabromo BPA/BPA copolycarbonate flame retardant | 17.2 | 17.2 |
| Fluorocarbon drip suppressant | 0.4 | 0.4 |
| Titanium dioxide pigment package | 1.20 | 1.20 |
| Benzotriazole UV-absorber | 0.5 | 0.5 |
| Properties | | |
| Spectral gloss, 60° | 60 | 87 |
| Izod impact strength, ft.lbs /in. | 3.1 | 1.4 |
| UL-94 Flammability Rating, 1/16" | VO | VO |

[a]General Electric Company, LEXAN 141.
[b]Eastman Kodak Company, TENITE 7352
[c]DuPont Company, ELVALOY 837.

The data in Table 4 demonstrates significant gloss reduction without affecting other properties. It also shows that impact strength is improved with higher amounts of the terpolymer.

The foregoing patents and publications are incorporated herein by reference, as are the Standard Test Methods. Obviously, many variations will suggest themselves to those skilled in this art in light of the above, detailed description. For example, the aromatic polycarbonate can be replaced in whole or in part with a polyester carbonate containing units derived from bisphenol A, phosgene and terephthaloyl chloride and/or isophthaloyl chloride. The aromatic polycarbonate can be replaced in whole or in part by a polycarbonate containing units of bis(3,5-dimethyl-4-hydroxy phenyl)-sulfone, alone, or combined with bisphenol-A. The poly(ethylene terephthalate) can be replaced in whole or in part by poly(1,4-butylene terephthalate) or by a polyester derived from 1,4-cyclohexanedimethanol alone or combined with ethylene glycol and terephthalic acid and/or isophthalic acid. The polyester can be replaced in whole or in part by a styrene resin, such as polystyrene or an acrylonitrile-styrenebutadiene terpolymer, or by a styrene-maleic anhydride copolymer. All such obvious modifications are within the full intended scope of the appended claims.

I claim:

1. A method for flatting the surface of an extrudable, moldable or heat formable thermoplastic polymer composition selected from
    (a) an aromatic polycarbonate, an aromatic polyester carbonate, an aromatic dihydric phenol sulfone carbonate, or a mixture of any of the foregoing, alone, or in combination with
    (b)
        (i) a polyester resin comprising units of an aliphatic diol, a cycloaliphatic diol, or a mixture of such diols, and an aromatic diacid,
        (ii) a vinyl aromatic polymer, copolymer or terpolymer, or
        (iii) a mixture of (i) and (ii), said method comprising
    A. blending with said polymer composition before or during processing,
    (c) a copolymer comprising, by weight
        (i) 40–80% ethylene,
        (ii) 3–30% carbon monoxide, and
        (iii) 5–60% of one or more termonomers copolymerizable therewith to produce solid terpolymers, in an amount from about 0.2 to about 15 parts by weight per 100 parts by weight of the total blend; and, thereafter,
    B. extruding, molding or heat forming the blend into an article having a flatted surface and high strength.

2. A method as defined in claim 1 wherein component (a) comprises an aromatic polycarbonate.

3. A method as defined in claim 2 wherein component (a) comprises poly(bisphenol-A carbonate).

4. A method as defined in claim 1 wherein component (a) comprises an aromatic polycarbonate and component (b) comprises a polyester resin comprising units of an aliphatic diol and an aromatic diacid.

5. A method as defined in claim 4 wherein component (a) comprises poly(bisphenol-A carbonate) and component (b) comprises poly(ethylene terephthalate).

6. A method as defined in claim 1 wherein said thermoplastic polymer composition also includes an effective amount of a flame-retardant agent.

7. A method as defined in claim 1 wherein in component (c), termonomer (iii) comprises an unsaturated mono- or dicarboxylic acid of 2–20 carbon atoms, esters of said unsaturated mono- or dicarboxylic acids, vinyl esters of saturated carboxylic acids where the acid has 1–18 carbon atoms, vinyl alkyl ethers wherein the alkyl group has 1–18 carbon atoms, acrylonitrile, norbornene, alpha-olefins of 3–12 carbon atoms, and vinyl aromatic compounds.

8. A method as defined in claim 7 wherein termonomer component (c)(iii) comprises vinyl acetate.

* * * * *